(12) United States Patent
Gu et al.

(10) Patent No.: US 12,526,757 B2
(45) Date of Patent: Jan. 13, 2026

(54) METHOD AND APPARATUS FOR SYNCHRONIZING TIMESLOT IN WIRELESS LOCAL AREA NETWORK SYSTEM

(71) Applicant: ELECTRONICS AND TELECOMMUNICATIONS RESEARCH INSTITUTE, Daejeon (KR)

(72) Inventors: Ja Beom Gu, Daejeon (KR); Tae Joon Park, Daejeon (KR); Jae Sun Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 485 days.

(21) Appl. No.: 17/993,095

(22) Filed: Nov. 23, 2022

(65) Prior Publication Data
US 2023/0171718 A1 Jun. 1, 2023

(30) Foreign Application Priority Data

Nov. 26, 2021 (KR) .................. 10-2021-0165912
Nov. 16, 2022 (KR) .................. 10-2022-0154006

(51) Int. Cl.
*H04W 56/00* (2009.01)
*H04W 84/12* (2009.01)

(52) U.S. Cl.
CPC ........ *H04W 56/0015* (2013.01); *H04W 84/12* (2013.01)

(58) Field of Classification Search
CPC ................... H04W 56/0015; H04W 84/12
USPC ........................................... 370/329
See application file for complete search history.

(56) References Cited

U.S. PATENT DOCUMENTS

| 7,286,551 | B2 | 10/2007 | Park et al. |
| 9,668,101 | B2 | 5/2017 | Marri Sridhar et al. |
| 2015/0327262 | A1 | 11/2015 | Kwon et al. |
| 2016/0345277 | A1* | 11/2016 | Segev ............... H04W 56/001 |
| 2017/0048671 | A1 | 2/2017 | Marri Sridhar et al. |
| 2018/0007647 | A1* | 1/2018 | Bilstad ............... H04J 3/0682 |

(Continued)

FOREIGN PATENT DOCUMENTS

KR 10-2018-0030585 A 3/2018
KR 10-1895378 B1 9/2018

OTHER PUBLICATIONS

Yi-Hung Wei et al., "Real-Time High-Speed Communication Protocol for Wireless Cyber-Physical Control Applications", 2013 IEEE 34th Real-Time Systems Symposium, 2013, pp. 140-149.

*Primary Examiner* — Robert J Lopata
(74) *Attorney, Agent, or Firm* — LRK PATENT LAW FIRM

(57) ABSTRACT

Disclosed herein is a method and apparatus for synchronizing timeslots in a wireless LAN system. The timeslot synchronization method includes: setting, by a first node, a timeslot synchronization reference based on a time synchronization function (TSF) value, followed by transmitting information about a reference of synchronization to a second node; and setting, by the second node, a timeslot synchronization reference based on a TSF value corresponding to the reference of synchronization based on the information transmitted from the first node.

18 Claims, 16 Drawing Sheets

(56) References Cited

U.S. PATENT DOCUMENTS

2018/0295595 A1* 10/2018 Shellhammer .... H04W 52/0229
2021/0160803 A1    5/2021 Bilstad et al.
2021/0321243 A1* 10/2021 Patil ..................... H04W 48/10
2023/0058871 A1*  2/2023 Xin ...................... H04W 72/56
2023/0341509 A1* 10/2023 Beg ..................... G01S 13/765
2024/0349373 A1* 10/2024 Dong ................... H04W 76/12

* cited by examiner

FIG. 8

| Element ID | Length | Superframe Info (Optional) | Slot Length | Superframe Length |
|---|---|---|---|---|
| 1 | 1 | 8 | 4 | 2 |

FIG. 9

| Element ID | Length | Slot Length | Superframe Length |
|---|---|---|---|
| 1 | 1 | 4 | 2 |

METHOD AND APPARATUS FOR SYNCHRONIZING TIMESLOT IN WIRELESS LOCAL AREA NETWORK SYSTEM

CROSS-REFERENCE TO RELATED APPLICATIONS

The present application claims priority under 35 U.S.C. § 119(a) to Korean Application No. 10-2021-0165912, filed on Nov. 26, 2021 in the Korean Intellectual Property Office, and Korean Application No. 10-2022-0154006 filed on Nov. 16, 2022 in the Korean Intellectual Property Office, which are hereby incorporated by reference for all purposes as if set forth herein.

BACKGROUND

1. Technical Field

The present invention relates to wireless local area network technology and, more particularly, to a method and apparatus for synchronizing timeslots in a wireless local area network system.

2. Description of Related Art

In recent years, with increasing distribution of wireless local area networks (LANs) capable of supplying rapid wireless communication services to mobile devices, interest in use of wireless LANs is increasing in various industrial fields. For example, such industrial fields include smart factories, industrial Internet-of-Things (IoT), drones or similar manned/unmanned vehicles, automatic guided vehicles, exoskeletons, network games, audio/video streaming, and the like.

In such industrial fields, the wireless LAN not only provides Internet access, but also constructs a time sensitive network required for each industry such that terminals can quickly perform synchronized operations, while monitoring the operations.

A current wireless LAN is constructed based on the IEEE (Institute of Electrical and Electronics Engineers) 802.11 standard, which was initially set to support a communication speed of 1 Mbps to 2 Mbps and has been improved to increase the transmission band and frequency efficiency through amendments, such as IEEE 802.11a, IEEE 802.11n, IEEE 802.11ac, IEEE 802.11ax, and the like.

The wireless LAN standard has been developed to operate in 2.4 GHz or 5 GHz bands, which are unlicensed bands, and is expected to operate in 6 GHz bands in the future.

The wireless LAN divides the entire band into small frequency units, such as 20 MHz, 40 MHz, and 80 MHz, in order to allow efficient use of the wide frequency band in such unlicensed bands, and each of these frequency units is referred to as a channel.

In a wireless LAN system, multi-access technology through CSMA/CA (Carrier Sense Multiple Access/Collision Avoidance) is adopted to allow multiple nodes to perform efficient communication by sharing limited wireless channels, and recently, discussion on standardization for adopting a technique for ensuring transmission delay has been made through the IEEE 802.11be amendment. However, although the wireless LAN is effective in providing the wireless Internet to mobile devices, it is known in the art that it is difficult for the wireless LAN to always satisfy network delay performance required for a time-sensitive network for use in the industrial fields due to the following reason.

Such difficulty is encountered since the wireless LAN is basically designed based on contention and collision avoidance through clear channel assessment (CCA)-based random access in order to grant the same channel access right to all communication nodes using the same wireless channel including an access point. In the wireless LAN, when a channel idle state confirmed by CCA continues for a certain period of time, that is, DIFS (Distributed coordination function Interframe Space), a back-off counter is randomly set and data is transmitted by a node at which the back-off counter reaches 0. As such, since data transmission is carried out by a random counter, there is a problem in that data transmission is variably carried out.

Moreover, a dominant duration of a channel once allowed is determined based on the length and transmission rate of data transmitted by a node occupying the channel, the presence of transmission failure, and the like. Therefore, while one node carries out data transmission, other nodes are allowed to contend for channel access again only after data transmission of the one node is completed. As a result, it is not possible to know in advance how long data transmission of the one node will take.

SUMMARY

It is an aspect of the present invention to provide a method and apparatus for synchronizing timeslots in a wireless LAN system, which can achieve timeslot synchronization based on a time synchronization function (TSF) value inherent to the wireless LAN system so as to allow the wireless LAN system to efficiently implement time-division multiple access (TDMA) communication.

It is another aspect of the present invention to provide a method and apparatus for synchronizing timeslots in a wireless LAN system, which can be applied to multiple links.

In accordance with one aspect of the present invention, a method of synchronizing timeslots in a wireless LAN system includes: setting, by a first node, a timeslot synchronization reference based on a TSF value, followed by transmitting information about a reference of synchronization to a second node; and setting, by the second node, a timeslot synchronization reference based on a TSF value corresponding to the reference of synchronization based on the information transmitted from the first node.

In some embodiments, timeslot synchronization may be carried out by generating an interrupt by each of the first node and the second node.

In some embodiments, the timeslot synchronization reference may comprise an interrupt start time value and an interrupt generation period.

In some embodiments, the timeslot synchronization reference may be set based on a timeslot length and a superframe length for time-division multiple access (TDMA) communication.

In some embodiments, the first node and/or the second node may read a current TSF value to calculate a timeslot number upon occurrence of the interrupt and may determine whether the calculated timeslot number corresponds to a timeslot allocated thereto.

In some embodiments, the first node and/or the second node may determine whether data transmission is to be performed upon determining that the calculated timeslot number corresponds to the timeslot allocated thereto.

In some embodiments, the information about the reference of synchronization may include information about a timeslot length and a superframe length for time-division multiple access (TDMA) communication.

In some embodiments, the information about the reference of synchronization may further include a TSF value relating to a synchronization start time in the second node.

In some embodiments, the first node may be an access point and the second node may be a station.

In accordance with another aspect of the present invention, a method of synchronizing timeslots in a wireless LAN system includes: setting, by a node, a timeslot synchronization reference based on a TSF value and based on a timeslot length and a superframe length for time-division multiple access (TDMA) communication; and performing, by the node, communication through TDMA synchronization according to the timeslot synchronization reference set thereby.

In some embodiments, the timeslot synchronization reference may comprise an interrupt start time value and an interrupt generation period.

In some embodiments, the step of performing communication through TDMA synchronization may include reading, by the node, a current TSF value to calculate a timeslot number upon generation of an interrupt; and determining, by the node, whether the calculated timeslot number corresponds to a timeslot allocated thereto.

In some embodiments, the step of performing communication through TDMA synchronization may further include determining, by the node, whether data transmission is to be performed upon determining that the calculated timeslot number corresponds to the timeslot allocated thereto.

In some embodiments, the node may transmit an interrupt generated at one link to another link, when the node is connected to the other node through multiple links.

In some embodiments, the node may transmit a determination result at one link as to whether the calculated timeslot number corresponds to the timeslot allocated thereto to another link, when the node is connected to the other node through multiple links.

In some embodiments, the method may further include receiving, by the node, information about a timeslot length and a superframe length from another node before the step of setting the timeslot synchronization reference.

In some embodiments, the information received by the node from the other node may further include a TSF value regarding a synchronization start time.

In accordance with a further aspect of the present invention, an apparatus for synchronizing timeslots in a wireless LAN system includes: an interrupt generator generating an interrupt signal according to an interrupt start time value and an interrupt generation period for timeslot synchronization of TDMA communication, when the interrupt start time value and the interrupt generation period are set; a timeslot determination unit reading a current TSF value to calculate a timeslot number upon receiving the interrupt signal, and generating a timeslot allocation determination signal when the calculated timeslot number corresponds to a timeslot allocated thereto; and a data transmission determination unit determining whether data transmission is to be performed and transmitting data when there is a need for data transmission, upon receiving the timeslot allocation determination signal.

In some embodiments, when an access point is connected to a station or stations in a multilink method, the apparatus may include multiple timeslot determination units allocated to the multiple links, respectively, and the interrupt generator may transmit the interrupt signal to the multiple timeslot determination units.

In some embodiments, when an access point is connected to a station or stations in a multilink method, the apparatus may include multiple data transmission determination units allocated to the multiple links, respectively, and the timeslot determination unit may transmit the timeslot allocation determination signal to the multiple data transmission determination units.

In some embodiments, the interrupt start time value and the interrupt generation period may be set based on a TSF value.

The method and apparatus for synchronizing timeslots in a wireless LAN system according to the present invention can achieve timeslot synchronization based on a TSF value inherent to the wireless LAN system, thereby allowing the wireless LAN system to effectively implement TDMA communication.

The method and apparatus for synchronizing timeslots in a wireless LAN system according to the present invention allow TSF-based timeslot synchronization at one wireless link to be applied to other wireless links, thereby eliminating a need for a plurality of timeslot synchronization apparatuses or processes in multilink TDMA.

BRIEF DESCRIPTION OF THE DRAWINGS

FIG. 8 and FIG. 9 are views illustrating a TSF timeslot information element in the method of synchronizing timeslots in the wireless LAN system according to the embodiment of the present invention.

DETAILED DESCRIPTION

Hereinafter, embodiments of the present invention will be described with reference to the accompanying drawings. In the accompanying drawings, the thickness of lines and the size of components may be exaggerated for clarity and descriptive purposes. In addition, terms to be described below are defined in consideration of functions in the present invention, and may vary according to the intention or practice of a user or an operator. Therefore, such terms should be defined based on the entire content disclosed herein.

Figure 1:
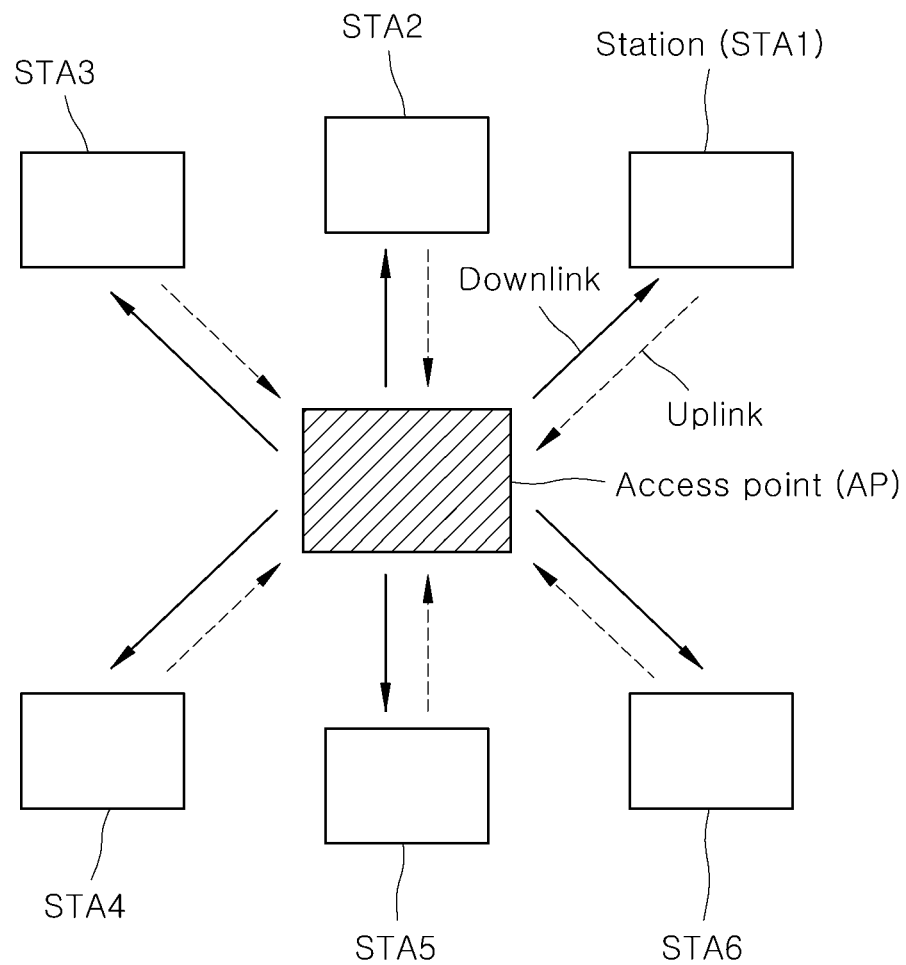
FIG. 1 is a diagram illustrating a basic service set of a wireless LAN system constituted by multiple wireless LAN nodes.

FIG. 1 is a diagram illustrating a basic service set of a wireless LAN system constituted by multiple wireless LAN nodes.

A wireless LAN includes multiple wireless LAN devices (nodes) in a single basic service set (BSS). The wireless LAN devices may include a media access control (MAC) layer, a physical (PHY) layer, and the like according to the IEEE 802.11 standard.

At least one of the multiple wireless LAN devices is an access point (AP) and the remaining wireless LAN devices are typically referred to as stations (STA).

On the other hand, a transmitter/receptor pair, which is constituted by a pair of a transmitter and a receiver, in the wireless LAN, is also referred to as a link. Accordingly, one channel used by a communication node may be generally referred to as one link. Here, a link configured to allow the access point to transmit data while allowing the stations to receive the data is referred to as a downlink and a link configured to allow the stations to transmit the data while allowing the access point to receive the data is referred to as an uplink. For application to mobile devices or industrial systems, one communication node is generally constituted by one link. However, in order to improve transmission efficiency or prevent transmission failure, one communication node may be constituted by multiple links. Here, the multiple links are capable of operating in the same channel or in the same band or different bands.

Multiple access technology includes time division multiple access (TDMA), frequency division multiple access (FDMA), code division multiple access (CDMA), orthogonal frequency division multiple access (OFMA), and the like in addition to CSMA/CA described above.

TDMA is a multiple access technology in which a wireless band (also referred to as a channel) is divided into timeslot units, which are time intervals, and each node communicates using all bands in a timeslot allocated thereto. Since a TDMA node transmits data at a different time from other nodes, TDMA eliminates the possibility of collision.

On the other hand, the wireless LAN system defines a time synchronization function (TSF) value exhibiting constant synchronization performance and is regulated to maintain a difference in synchronization performance between the access point and the stations, which are nodes constituting the wireless LAN system, within a predetermined error. For example, a system based on the IEEE 802.11 standard is regulated to maintain synchronization performance within ±20 ppm.

TSF may be considered as a kind of 64-bit counter incremented by 1 bit every microsecond.

The wireless LAN system is configured to allow the access point to transmit a beacon frame including a TSF value of the access point when the access point transmits the beacon frame. A station receiving the beacon frame reduces an error by updating a TSF value of the station corresponding to the TSF value of the access point. In the IEEE 802.11 standard, a TSF timer is simply regulated to provide the MLME-GETTSFTIME.request or MLME-GETTSFTIME.confirm method that can be used to read the corresponding value thereof and details in use of the method are not defined.

The present invention relates to a method of synchronizing timeslots using a TSF so as to solve problems of a typical technology, which uses a high-precision clock or a complicated protocol procedure in order to synchronize a system clock and requires frequent transmission of separate messages, in implementation of TDMA communication by a wireless LAN system.

In use of a high performance wireless LAN, transmission technology, such as multi-channel transmission, multi-band transmission or multi-link transmission, is used in order to improve frequency utilization efficiency or to reduce transmission errors of the wireless LAN. Here, the multi-channel transmission means transmission of data to one or more channels and the multi-band transmission means transmission of data to one or more bands among unlicensed bands of 2.4 GHz, 5 GHz, and 6 GHz. In addition, the multi-link means a system constituted by multiple transmitter/receptor pairs in order to constitute multiple channels and multiple bands.

In order to apply typical TDMA communication to a multi-channel, multi-band or multi-link transmission system constituted by multiple transmitter/receptor pairs, it is necessary for each link to perform a process for timeslot synchronization. Thus, according to the present invention, when setting of timeslot synchronization using a TSF value is completed between an access point and a station constituted by a certain transmitter/receiver pair for application of TDMA communication in the wireless LAN, other transmitter/receiver pairs are allowed to use the timeslot synchronization using the TSF value without newly setting timeslot synchronization using a new TSF.

Figure 2:
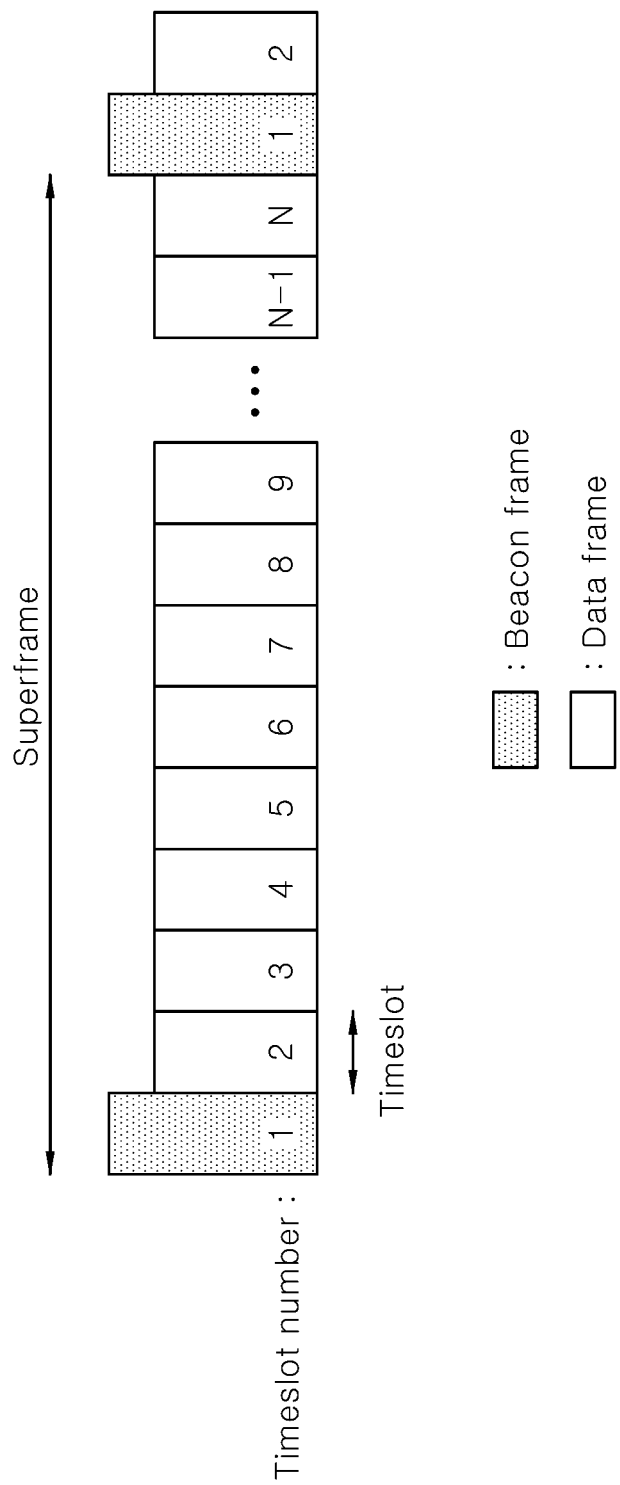
FIG. 2 is a diagram illustrating a superframe in a method of synchronizing timeslots in a wireless LAN system according to one embodiment of the present invention.

FIG. 2 is a diagram illustrating a superframe in a method of synchronizing timeslots in a wireless LAN system according to one embodiment of the present invention.

Referring to FIG. 2, a superframe is constituted by multiple timeslots. In this embodiment, the superframe is constituted by N timeslots, in which the first timeslot number is set to No. 1 and the last timeslot number is set to No. N. The first timeslot of a new superframe starts from No. 1. Some timeslots may be allocated to allow an access point to transmit data frames. Such timeslots are referred to as timeslots for downlink. Other timeslots may be allocated to allow stations to transmit data frames. Such timeslots are referred to as timeslots for uplink. In addition, other timeslots may be used for a particular purpose. For example, since the access point periodically transmits a beacon frame in the wireless LAN, the first timeslot of the superframe may be used for this purpose, as shown in FIG. 2.

Herein, various configurations can be implemented for transmission in such a superframe and, when a superframe is described as being constituted by a non-predetermined number of timeslots, that is, N timeslots, it means that one superframe is constituted by one or more timeslots. However, it should be understood that the number of timeslots is not intended to limit the spirit of the present invention.

Such a timeslot length and a superframe length for TDMA may be predetermined. For example, predetermined system parameters or values set by a manager may be used as the timeslot length and the superframe length.

In the following description, the timeslot synchronization operation of the access point and the station will be described. As described above, the access point and the station can be referred to as nodes, so the access point or the station may be referred as a first node, a second node, another node, etc.

obtained by adding a TSF value corresponding to a floating time to the current TSF value, as the interrupt start time value.

The access point may set the timeslot length as the interrupt generation period.

Here, the interrupt generation period and/or the timeslot length may be set in consideration of a length of data to be transmitted and a transmission rate of the data.

The following Table 1 shows time values for data transmission in microseconds for each data length and at each data transmission rate in the wireless LAN. For example, when the data length is 150 bytes, data transmission requires about 44 microseconds at a data transmission rate of 54 Mbps according to the IEEE 802.11a standard.

TABLE 1

| Data size (w/Header) | 11b Long Preamble (11 Mbps) | 11a Long Preamble (54 Mbps) | 11n MC50 Long preamble (6.5 Mbps) | 11n MCS7, Long preamble (65 Mbps) | 11ac MCS8, VHT preamble, GI = 800 (78 Mbps) | 11ax MCS11 w/HE SU preamble, GI = 800 (143.3 Mbps) |
|---|---|---|---|---|---|---|
| 150 | 302 | 44 | 208 | 40 | 56 | 57.6 |
| 500 | 556 | 96 | 640 | 84 | 92 | 84.8 |
| 1024 | 937 | 176 | 1284 | 148 | 148 | 112 |
| 1536 | 1310 | 248 | 1916 | 212 | 200 | 139.2 |

Figure 3:
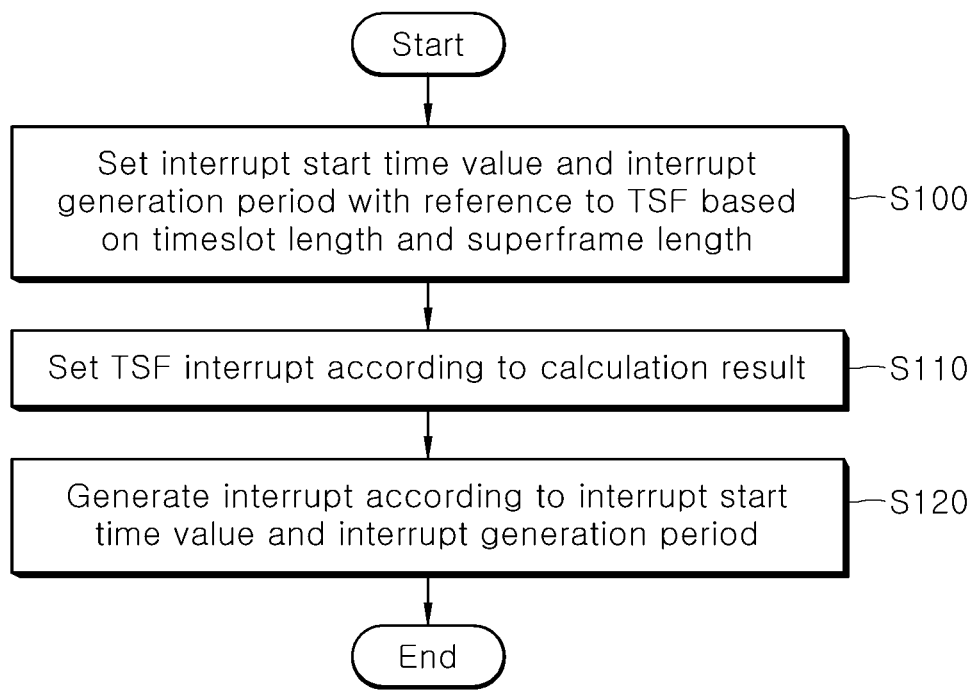
FIG. 3 is a flowchart illustrating an interrupt setting procedure of the method of synchronizing timeslots in the wireless LAN system according to the embodiment of the present invention.

FIG. 3 is a flowchart illustrating an interrupt setting procedure of the method of synchronizing timeslots in the wireless LAN system according to the embodiment of the present invention.

Referring to FIG. 3, the interrupt setting procedure by the access point with reference to a TSF value using the timeslot length and the superframe length includes setting, by the access point, an interrupt start time value and an interrupt generation period with reference to the TSF value based on information about the timeslot length and the superframe length (S100), and setting, by the access point, a TSF interrupt according to a set result (S110).

Thereafter, the interrupt is generated according to the interrupt start time value and the interrupt generation period (S120).

Herein, the expression "with reference to TSF," "based on TSF" or "TSF-based" means use of a kind of timer value (for example, timer value increased by 1 every microsecond) with a size of 64 bits in microsecond units defined in the wireless LAN called TSF or use of a relative value with reference to the timer value.

By way of example, the timeslot length is a value corresponding to 100 seconds when a TSF value at a certain time is 100,000,000. Accordingly, it is possible to specify that 10 milliseconds is the first timeslot and 10 milliseconds after the first timeslot is the second timeslot. In this case, the first timeslot is a period of time from 100,000,000 to 100,010,000 with reference to the TSF and the second timeslot is a period of time from 100,010,000 to 100,020,000 with reference to the TSF.

Here, the interrupt start time value and the interrupt generation period are set with reference to a current TSF value that the access point has. Since the access point is required to newly start an interrupt based on a TSF value thereof using the interrupt start time value, it is desirable to provide a sufficient float (floating time) to proceed with such setting. For example, assuming that the current TSF value is 123,400,000, it is possible to set 123,500,000, which is a TSF value after about 100 milliseconds, as the start time value. That is, the access point may set a value, which is Accordingly, the interrupt generation period may be set through sufficient consideration of time for data transmission. For example, assuming that 500 microseconds is required for data transmission, it is possible to set 1000 microseconds as the interrupt generation period in order to complete data transmission in a single timeslot.

Figure 4:
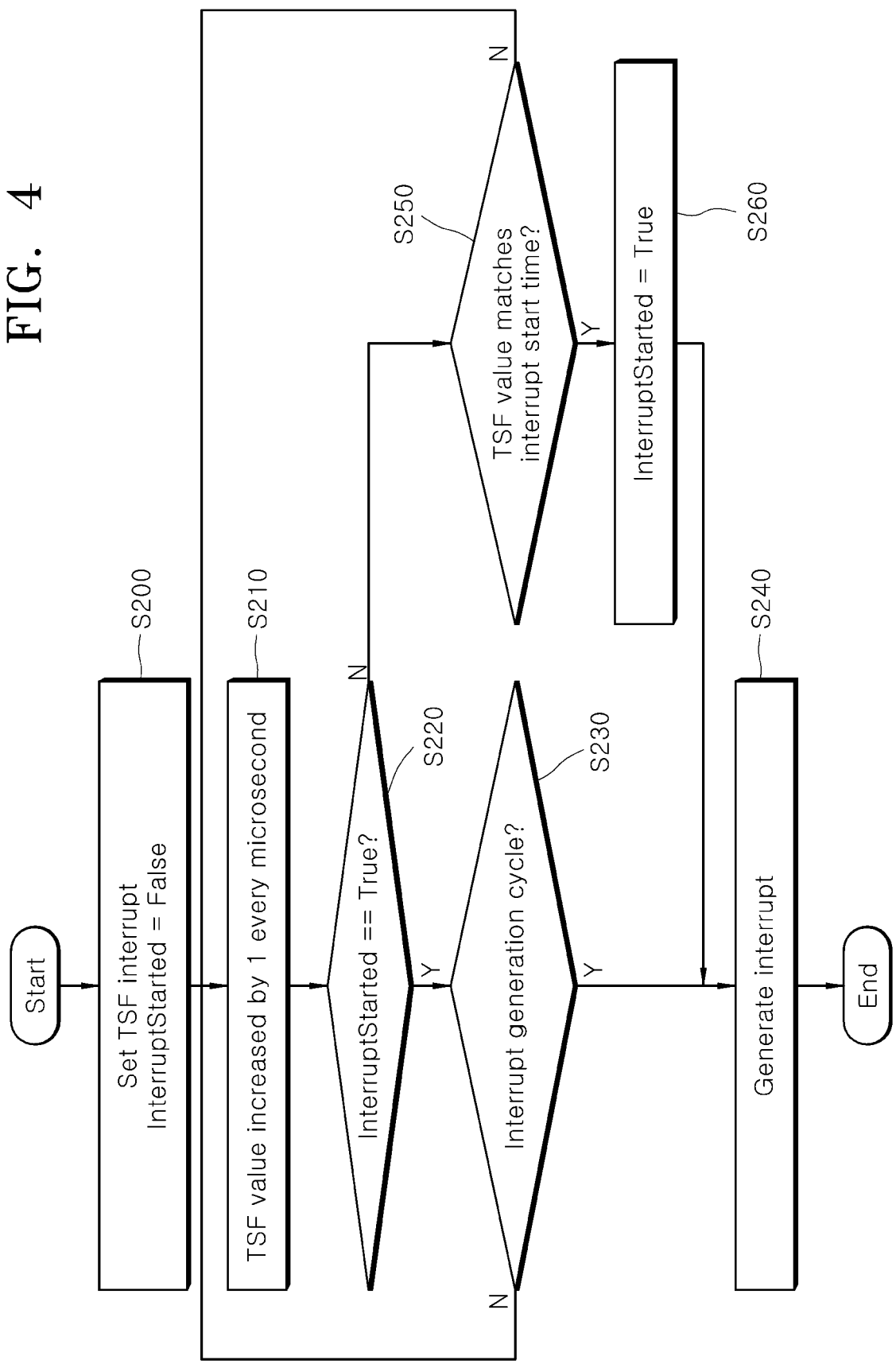
FIG. 4 is a flowchart illustrating an interrupt generation procedure of the method of synchronizing timeslots in the wireless LAN system according to the embodiment of the present invention.

FIG. 4 is a flowchart illustrating an interrupt generation procedure of the method of synchronizing timeslots in the wireless LAN system according to the embodiment of the present invention.

Referring to FIG. 4, the access point performs as follows with reference to a TSF value increased by 1 every microsecond when the interrupt start time value and the interrupt generation period are set. When the interrupt start time value and the interrupt generation period are set, the access point sets an InterruptStarted value as False (S200).

Every time that the TSF value increases by 1 (S210), the access point determines whether the TSF value matches the interrupt generation start value (S250) upon determining that an interrupt is not started (upon determining that the InterruptStarted value is False) (N in S220).

Upon determining that the TSF value matches the interrupt generation start value (Y in S250), the access point changes the InterruptStarted value to True and generates an interrupt (S260).

Upon determining that the TSF value does not match the interrupt generation start value (N in S250), the procedure returns to S210.

Every time that the TSF value increases by 1 (S210), the access point determines whether a current time pertains to the interrupt generation period (S230) upon determining that the interrupt is started (upon determining that the InterruptStarted value is True) (Y in S220). Here, determination as to whether the current time pertains to the interrupt generation period is to determine whether a calculation result of (TSF value−start time) corresponds to a multiple of the interrupt generation period.

Upon determining that the current time pertains to the interrupt generation period (Y in S230), the access point generates the interrupt (S240), and upon determining that the current time does not pertain to the interrupt generation period (N in S230), the procedure returns to S210.

Since such an interrupt is periodically generated, the procedure returns to S210, in which the TSF value increases by 1 every microsecond, after generation of an actual interrupt (S240), and this procedure is repeated to generate an interrupt according to the interrupt generation period.

Generation of the interrupt may be carried out in the same manner as in the station, as described below.

In some embodiments, when an interrupt generator 110, a timeslot determination unit 120, and a data transmission determination unit 130 are implemented logically, physically, or hierarchically separated from a main controller of the access point or the station, the interrupt generator 110 of the access point or the station may be implemented to start interrupt generation in response to the interrupt start time value and the interrupt generation period of the station sent from another module (for example, the main controller) and to transmit an interrupt generation signal to another module (for example, the timeslot determination unit 120) upon generation of the interrupt.

Figure 5:
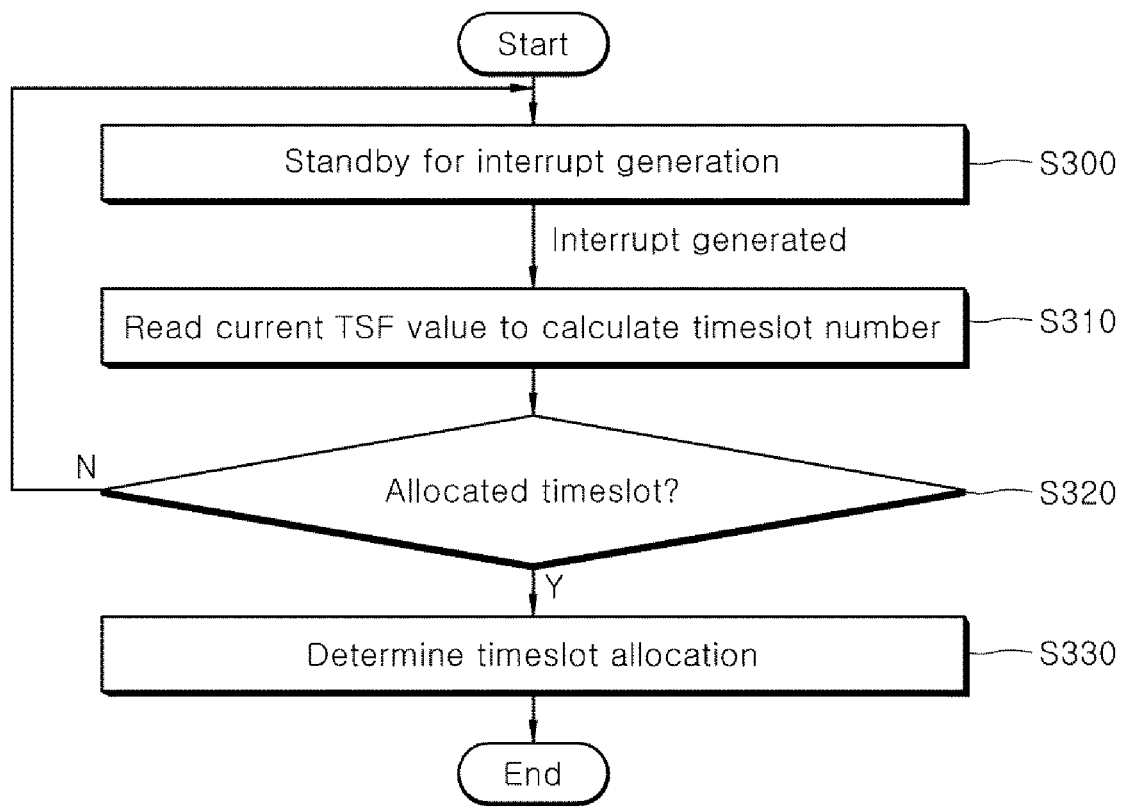
FIG. 5 is a flowchart illustrating a timeslot determination procedure of the method of synchronizing timeslots in the wireless LAN system according to the embodiment of the present invention.

FIG. 5 is a flowchart illustrating a timeslot determination procedure of the method of synchronizing timeslots in the wireless LAN system according to the embodiment of the present invention.

Referring to FIG. 5, when an interrupt is generated during standby for interrupt generation (S300), the access point reads a current TSF value to calculate a timeslot number (S310).

Here, reading the current TSF value may be carried out using the MLME-GETTSFTIME.request and MLMEGETTSFTIME.confirm methods defined in the IEEE 802.11 standard, as described above.

Calculation of the timeslot number may be carried out using a value obtained by dividing the TSF value by the timeslot length in accordance with Equations 1 and 2.

$$\text{Timeslot reference} = \text{interrupt generation start time value} \div \text{timeslot length} \qquad <\text{Equation 1}>$$

$$\text{Timeslot number} = \text{TSF value} \div \text{timeslot length} - \text{timeslot reference} + 1 \qquad <\text{Equation 2}>$$

In Equation 1, the timeslot reference is a calculation value for determining a reference of a timeslot corresponding to a time when the interrupt is first generated and, in Equation 2, the timeslot number is a value indicating the number of timeslots corresponding to a current time from the timeslot corresponding to the time when the interrupt is first generated.

Since the timeslot number is calculated based on a difference with respect to the timeslot reference, the timeslot corresponding to the time when the interrupt is first generated is 1 and the timeslot number increases from 1 by 1 every timeslot.

Here, when the calculation result of Equation 2 is not a natural number, the timeslot number can be obtained by deleting decimal places.

Thereafter, the access point determines whether the calculated timeslot number is a timeslot allocated thereto (S320). That is, the access point determines whether the calculated timeslot number is a timeslot allocated thereto by comparing the calculated timeslot number with a list of timeslots allocated thereto.

Since the first timeslot of a new superframe always starts from 1 as shown in FIG. 2, it is possible to calculate the timeslot number within the superframe according to Equation 3, based on the timeslot number calculated according to Equation 2.

$$\text{Timeslot number in superframe} = \text{timeslot number} \% N \qquad <\text{Equation 3}>$$

In Equation 3, % means the remainder operation (modulo). Here, N indicates the number of timeslots in the superframe, as described above. When the calculation result is 0, the $N^{th}$ timeslot may be determined as the timeslot number in the superframe.

Equations 1 to 3 illustrate the process of calculating the timeslot reference corresponding to the superframe structure and the timeslot number shown in FIG. 2, the process of obtaining the timeslot number, or the process of the timeslot number in the superframe. When the superframe structure or the timeslot number is different from that calculated by these equations, the calculation method may also be changed.

Here, upon determining that the calculated timeslot number is the timeslot allocated to the access point (Y in S320), the access point determines allocation of the timeslot (S330), and upon determining that the calculated timeslot number is not the timeslot allocated to the access point (N in S320), the procedure returns to S300 to standby for next interrupt generation.

Since such determination on the timeslot of the interrupt is periodically carried out, the procedure returns to S300 to standby for next interrupt generation after actual generation of the interrupt (after S330).

In some embodiments, the timeslot determination unit 120 of the access point or the station may be implemented to start timeslot determination in response to an interrupt generation signal from another module (for example, interrupt generator 110) and to transmit a timeslot allocation determination signal to another module (for example, data transmission determination unit 130) in timeslot allocation determination.

Timeslot determination may be carried out in the same manner as in the station, as described below.

The access point and the station perform an interrupt generation and timeslot determination in based on the TSF, so synchronization of timeslots in the access point and the station can be achieved.

With regard to the aforementioned list of timeslots, allocation of the list of timeslots to wireless LAN nodes may be implemented by various methods or procedures, for example, a non-real-time announce method or a real-time announce method.

Here, since the process of allocating the list of timeslots to the wireless LAN nodes may be implemented by various methods known or unknown to those skilled in the art, this process will be briefly described as follows.

In the non-real-time announce method, for example, TDMA transmission is started after a timeslot number for each node is previously set. In this method, since the corresponding timeslot numbers are not changed during TDMA transmission, all nodes always use the same timeslots.

In the real-time announce method, for example, an announce frame is transmitted for real time allocation of the timeslot number by a unicast or broadcast method. In this method, the nodes receiving the announce frame may check to which timeslots the nodes are allocated based on information corresponding to the nodes, and the announce frame may be constituted to increase or decrease the number of timeslots to be allocated to one node.

Here, a difference between unicast and broadcast depends only on whether to put a unicast address or a broadcast address in a recipient address field in the MAC frame to specify the number of receiving nodes, and there is no other difference related to data transmission. When there is one receiving node, unicast transmission is used, and when there are multiple nodes, broadcast transmission is used. The format of the broadcast address commonly used in the wireless LAN is FF:FF:FF:FF:FF:FF.

Figure 6:
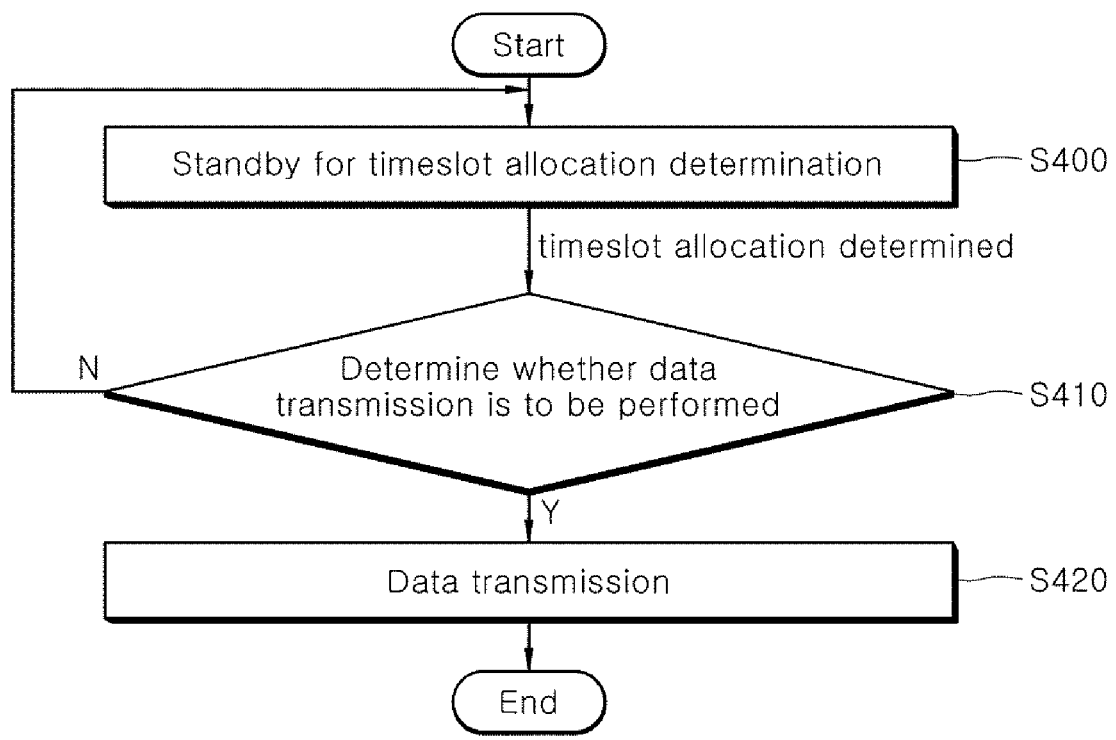
FIG. 6 is a flowchart illustrating a data transmission determination procedure of the method of synchronizing timeslots in the wireless LAN system according to the embodiment of the present invention.

FIG. 6 is a flowchart illustrating a data transmission determination procedure of the method of synchronizing timeslots in the wireless LAN system according to the embodiment of the present invention.

Referring to FIG. 6, when timeslot allocation determination occurs during standby for timeslot allocation determination (S400), the access point determines the need for data transmission (S410) and transmits data (S420) upon determining that there is a need for data transmission. In some embodiments, the data transmission determination unit 130 may be configured to perform the procedure shown in FIG. 6.

A node (access point or station) determines whether there is a need for data transmission only when the calculated timeslot is the timeslot allocated thereto. Here, determination as to the need for data transmission means that transmission of the corresponding data is carried out by the access point when there is data to be transmitted or when data to be transmitted can be newly generated. Otherwise, when there is no data to be transmitted or when data to be transmitted cannot be newly generated in the corresponding timeslot, data transmission is not carried out. Such determination as to the need for data transmission and data transmission may be carried out in the same way as in a general wireless LAN system.

Since the present invention relates to a method for efficiently implementing TDMA communication in a wireless LAN-based communication system, data transmitted in the corresponding timeslot may use not only the frame structure used in an existing wireless LAN, but also a new frame structure according to the system configuration. For example, since the IEEE 802.11ah standard regulates a frame having a smaller length than the frame of the existing wireless LAN, it is possible to use such a frame having a short length.

Figure 7:
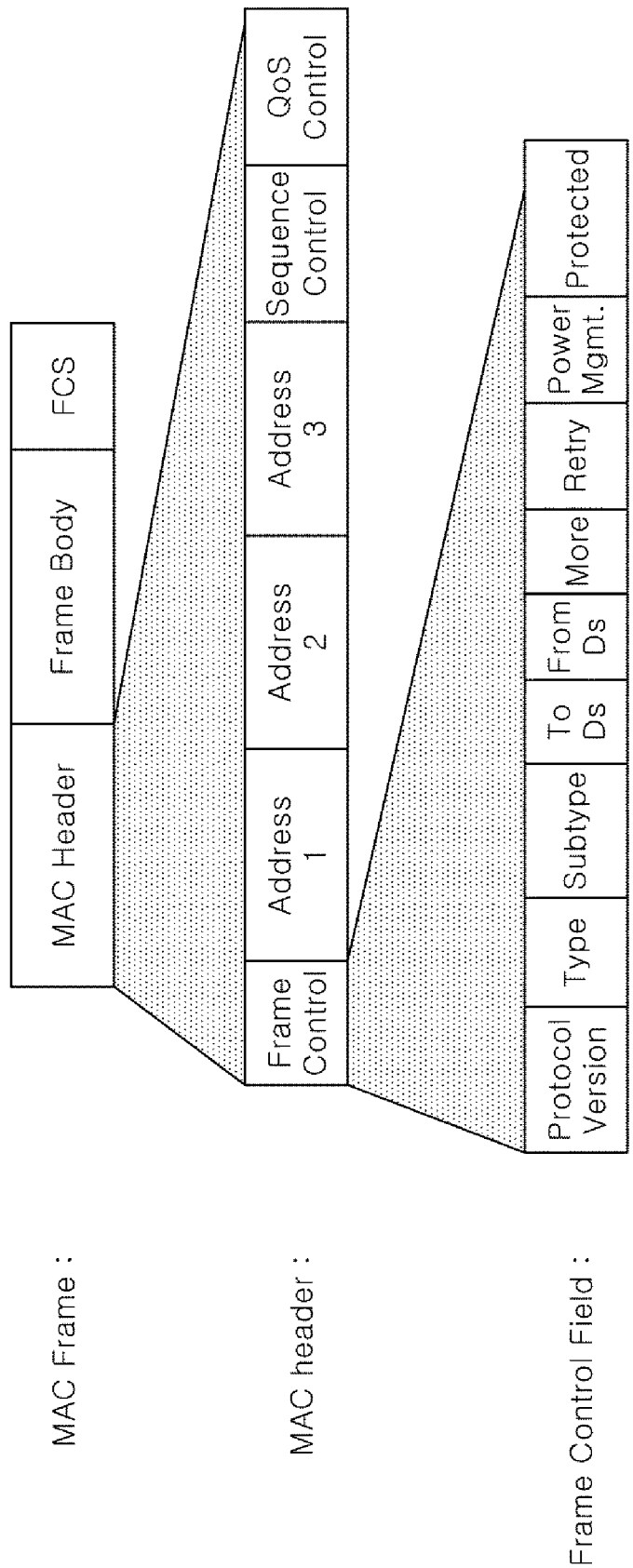
FIG. 7 is a diagram illustrating a data frame of a wireless LAN system according to one embodiment of the present invention.

FIG. 7 is a diagram illustrating a data frame of a wireless LAN system according to one embodiment of the present invention, in which the data frame is constituted by a MAC header, a frame body, and an FCS (Frame Check Sequence). The MAC header may have various configurations including the Frame Control field, address values represented by Address 1 to Address 3, the Sequence Control field, and the QoS Control field. More specifically, the Frame Control field may include the Protocol Version field, the Type field, and the like. However, it should be understood that such a data frame structure is provided for illustration of the method according to the present invention and the present invention may adopt a new frame structure.

FIG. 8 and FIG. 9 are views illustrating a TSF timeslot information element in the method of synchronizing timeslots in the wireless LAN system according to the embodiment of the present invention.

Specifically, FIG. 8 and FIG. 9 illustrate a wireless frame field for notifying a station of a TDMA timeslot length, a superframe length, and a superframe arrival time. A difference between FIG. 8 and FIG. 9 depends on whether the Superframe Info field is present and will be described in detail below.

As described above, allocation of the TDMA timeslot list may be implemented by the non-real-time announce method or the real-time announce method.

A TSF timeslot (interrupt) data announce according to the present invention may also be operated in a similar method. According to the present invention, by way of example, for real time allocation of the timeslot number, the announce frame is transmitted to allow many nodes to receive the announce frame using broadcast transmission. However, since there are various types of announce methods as described above, a method of notifying a station of the TDMA timeslot length, the superframe length, and the superframe arrival time may be implemented by various methods including the unicast method.

In order to announce the TDMA timeslot length, the superframe length and the superframe arrival time in real time, the MAC frame including the TSF timeslot information element as follows may be transmitted at a preset period.

In FIG. 8, Element ID indicates a unique value set to represent the type of information element in the wireless LAN. Here, figures, such as 1, 8, 4, 2, and the like, shown in the drawing indicate a data size (byte) of the corresponding field.

Length is the sum of the lengths of consecutive fields.

By way of example, in the TSF timeslot information element according to the present invention, Element ID may be set using a new unique value and Length may be set to 14 or 16 depending upon the presence of the Superframe Info field.

In the present invention, the TSF timeslot information element may optionally include or exclude the Superframe Info field. FIG. 8 shows one example in which the Superframe Info field is present and FIG. 9 shows one example in which the Superframe Info field is not present.

In the TSF timeslot information element, the Superframe Info field represents time information with respect to the superframe and a TSF value corresponding to the first timeslot to arrive at the future may be recorded in the corresponding field.

Since a station receiving such an information element is required to newly start an interrupt based on the corresponding TSF value of the station, there is a need to provide a sufficient float to proceed with the corresponding process. Thus, the access point recording a value of the Superframe Info field may select the TSF value corresponding to the first timeslot of a superframe that will arrive in the future, for example, after about 1 second (margin value) from a current TSF value of the access point.

In the Slot Length field of the TSF timeslot information element, the length of one timeslot of TDMA may be recorded in units of microseconds.

In the Superframe Length field of TSF timeslot information element, the length of the superframe of TDMA may be recorded in the form of the number of timeslots.

In addition, the TSF timeslot information element may be constructed without the Superframe Info field, as shown in FIG. 9.

In this case, the Length value may be set to 6.

This type of TSF timeslot information element may be used when a frame transmitting the TSF timeslot information element contains a field capable of representing the TSF value. For example, since a beacon frame has the Timestamp field capable of representing the TSF value of the access point, the TSF timeslot information element may include only the Slot Length field and the Superframe Length field. Other frames capable of including this type of TSF timeslot information element include, for example, Probe Response to Timing Advertisement frames.

In this method, a system may be implemented to allow a floating time for new start of a TSF-based interrupt to be processed by the station.

Although the TSF timeslot information element is illustrated and described in this embodiment, the type of TSF timeslot information element may be modified in various ways.

Figure 10:
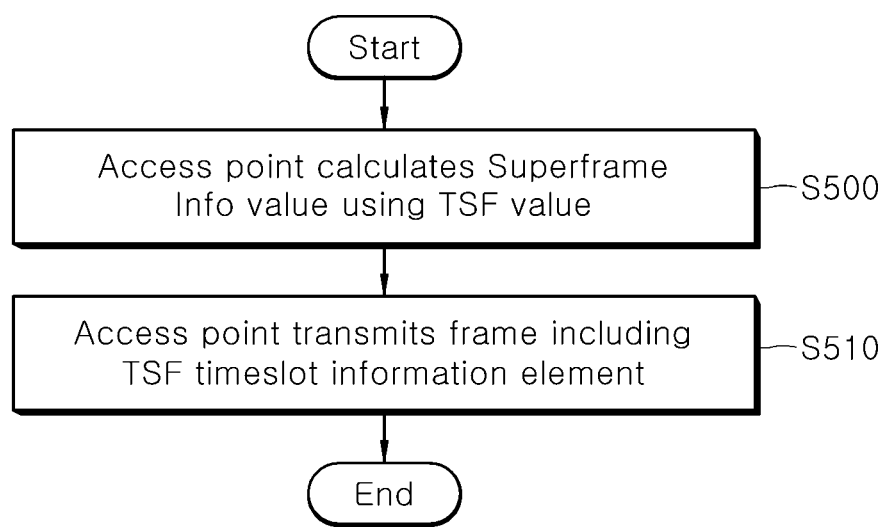
FIG. 10 is a flowchart illustrating timeslot information announce in the method of synchronizing timeslots in the wireless LAN system according to the embodiment of the present invention.

FIG. 10 is a flowchart illustrating timeslot information announce in the method of synchronizing timeslots in the wireless LAN system according to the embodiment of the present invention.

The access point may previously calculate the Superframe Info value in order to transmit a wireless frame including TSF timeslot information. The following Equations 4 and 5 illustrate one example of calculation of such Superframe Info. In some embodiments, since the access point may previously store the superframe length, the corresponding calculation may not be carried out.

$$\text{Superframe length} = \text{timeslot length} \times N \qquad \text{<Equation 4>}$$

$$\text{Superframe Info} = \text{current TSF \% superframe length} + \text{superframe length} \times 2 \qquad \text{<Equation 5>}$$

In Equation 4, the superframe length is a value obtained by multiplying the timeslot length by the number of timeslots in the superframe, and % in Equation 5 means the remainder operation (modulo).

The TSF value of the first timeslot of a current superframe may be obtained by calculating the remainder with the superframe length. Here, (superframe length)×2 is added to provide a time margin for securing a floating time to allow the stations to newly start generation of the TSF-based interrupt. That is, in this embodiment, the TSF value corresponding to the first timeslot of the subsequent second superframe is calculated.

The access point may generate the TSF timeslot information element shown in FIG. 8 after calculation of the Superframe Info value to transmit the TSF timeslot information.

In addition, although an absolute value of a future TSF value may be represented and used as the Superframe Info as calculated by Equation 5 according to the spirit of the present invention based on the TSF value, the TSF value of the first timeslot of the current superframe may also be represented and used as the Superframe Info.

$$\text{Superframe Info} = \text{current TSF \% superframe length} \qquad \text{<Equation 6>}$$

For example, as in Equation 6, the current TSF value may be used through calculation of the remainder with the superframe length. In this case, as shown in FIG. 9, it is possible to use the TSF timeslot information element not containing the Superframe Info field. In this case, a station receiving such TSF timeslot information may calculate and use a time margin for securing a floating time to allow the station to newly start generation of the TSF-based interrupt.

However, it should be noted that, since Equations 4, 5 and 6 illustrate the process of calculating the superframe length and the Superframe Info value corresponding to the superframe structure and the timeslot number shown in FIG. 2, a calculation method may also be changed when the superframe structure or the timeslot number is different from such illustration.

Accordingly, the access point calculates the Superframe Info value using the TSF value (S500) and transmits a frame including the TSF timeslot information element (S510).

The MAC frame including the TSF timeslot information element transmitted to announce the timeslot length, the superframe length and the superframe arrival time in real time may include only the TSF timeslot information element in the frame body. However, since the MAC frame of a typical wireless LAN generally includes at least one information element, the TSF timeslot information element may be further added to the frame body of the typical MAC frame.

For example, since the beacon frame includes various information elements and can transmit the information element at a frequency of about 100 ms or can transmit the information element to a particular timeslot of the superframe as described above, the beacon frame may include the TSF timeslot information element.

Figure 11:
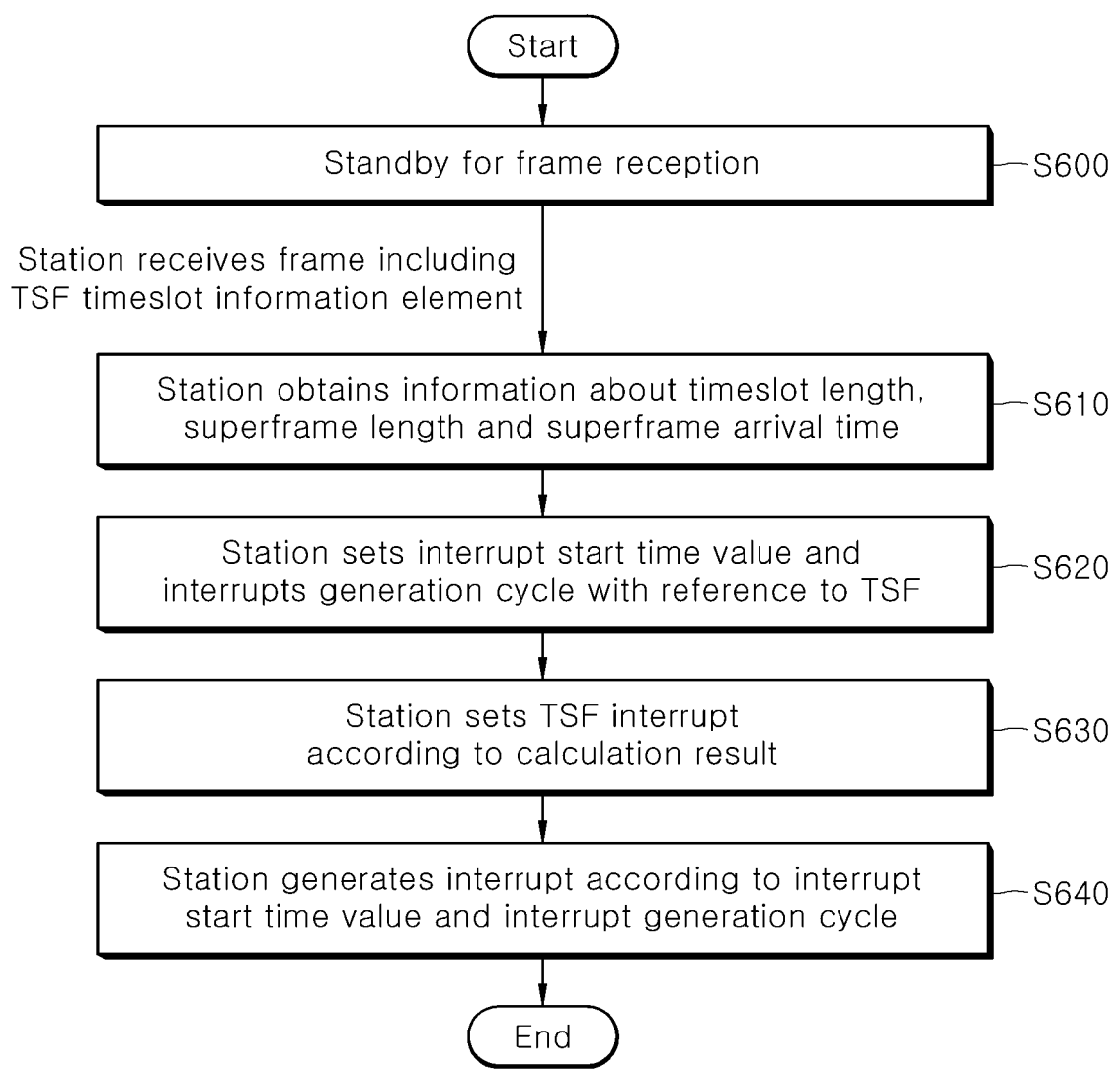
FIG. 11 is a flowchart illustrating the interrupt generation procedure at a station in the method of synchronizing timeslots in the wireless LAN system according to the embodiment of the present invention.

FIG. 11 is a flowchart illustrating an interrupt setting procedure at a station in the method of synchronizing timeslots in the wireless LAN system according to the embodiment of the present invention.

A station not starting a TSF-based interrupt waits until the station receives a frame including the TSF timeslot information element (S600). Upon receiving the frame including the TSF timeslot information element, the station obtains the timeslot length, the superframe length, and the superframe information from the TSF timeslot information element (S610).

The station sets the interrupt start time value and the interrupt generation period as the TSF reference based on the obtained information (S620).

Here, values recorded in the received TSF timeslot information element may be used as the interrupt start time value and the interrupt generation period value. That is, the Superframe Info value may be used as the interrupt start time value and the Slot Length value may be used as the interrupt generation period. The Superframe Length value is used to set the timeslot number in the superframe.

When the Superframe Info value calculated according to Equation 5 is used, the station may use this value as the interrupt start time value, as set forth in Equation 7.

$$\text{Interrupt start time value} = \text{Superframe Info value} \qquad \text{<Equation 7>}$$

When the Superframe Info value calculated according to Equation 6 is used, the station may use this value as the interrupt start time value, as set forth in Equation 8.

$$\text{Interrupt start time value} = \text{Superframe Info value} + \text{superframe length} \times 2 \qquad \text{<Equation 8>}$$

In Equation 8, since (superframe length)×2 is added to provide a time margin for securing a floating time to allow the station to newly start the TSF-based interrupt, this value may be freely selected by the station.

Thereafter, the station may set the TSF interrupt according to the calculation result (S630) and generates an interrupt according to the interrupt start time value and the interrupt generation period.

Generation of the interrupt, reading the current TSF value to calculate the timeslot number upon generation of the interrupt, determining whether the calculated timeslot is a timeslot allocated to the station, and determining data transmission upon determining that the calculated timeslot is the timeslot allocated thereto may be carried out by the station in the same way as the operations of the access point shown in FIG. 4 to FIG. 6.

On the other hand, when the station having already started generation of the TSF-based interrupt receives the frame including the TSF timeslot information element, the station may ignore this frame.

Figure 12:
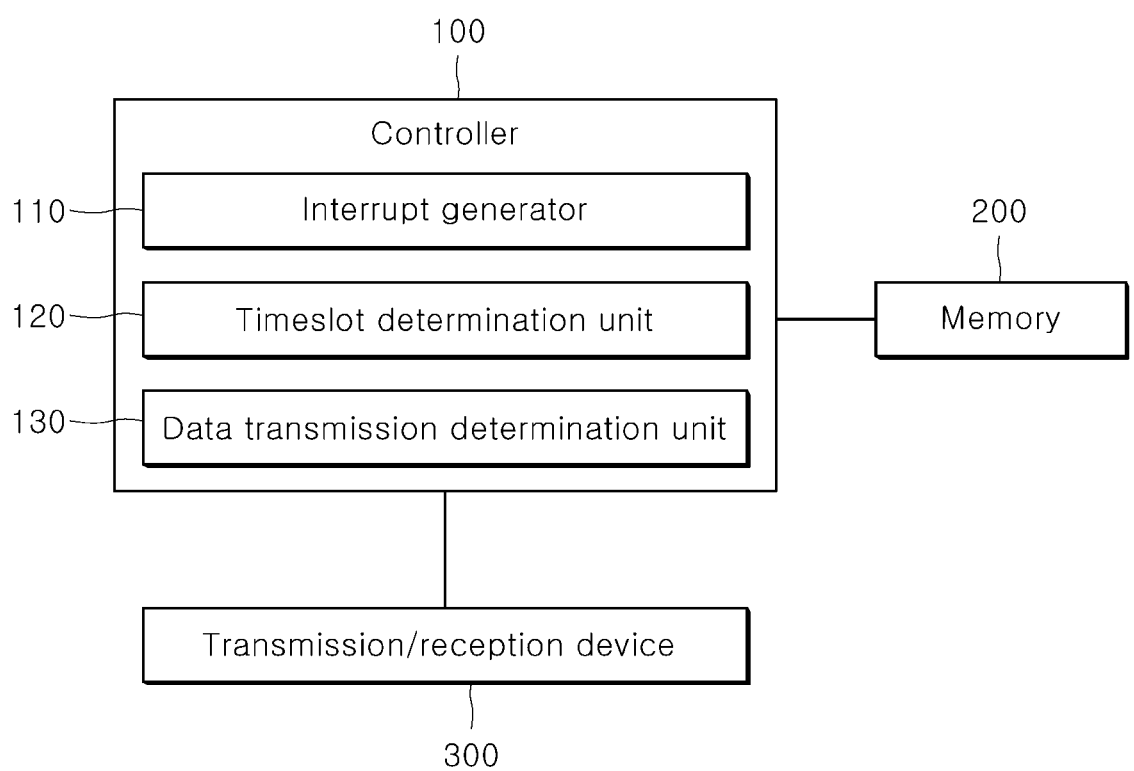
FIG. 12 is a block diagram of an apparatus for synchronizing timeslots in a wireless LAN system according to one embodiment of the present invention.

FIG. 12 is a block diagram of an apparatus for synchronizing timeslots in a wireless LAN system according to one embodiment of the present invention.

As shown in FIG. 12, the apparatus for synchronizing timeslots in the wireless LAN system according to the embodiment of the invention may include a controller 100, a memory 200, and a transmission/reception device 300.

The apparatus for synchronizing timeslots in the wireless LAN system may be a node, that is, an access point, or a station.

In some embodiments, the controller 100 may be constructed by a processor. The processor may implement the timeslot synchronization function of the access point or the station as described above. Instructions for implementation of the timeslot synchronization function may be stored in the memory 200. In addition, setting information, such as a TDMA timeslot length and a superframe length, may also be stored in the memory 200.

The transmission/reception device 300 may be implemented by a transceiver to receive and transmit wireless signals, and may implement the physical layer of IEEE 802.11.

The processor and/or the transceiver may include an ASIC (Application-Specific Integrated Circuit), other chipsets, logic circuits and/or data processors. The memory may include a read-only memory (ROM), a random access memory (RAM), a flash memory, a memory card, a storage medium and/or other storage devices. When an embodiment is implemented in software, the aforementioned technique may be implemented as a module (process, function, and the like) that performs the aforementioned function. The module may be stored in the memory 200 and executed by the processor. The memory 200 may be placed inside or outside the processor and may be connected to the processor by various means.

In some embodiments, the controller 100 may include an interrupt generator 110, a timeslot determination unit 120, and a data transmission determination unit 130. In addition, the controller 100 may further include a main controller to perform other functions of the access point or the station. The main controller, the interrupt generator 110, the timeslot determination unit 120, and the data transmission determination unit 130 may be implemented as logically, physically or hierarchically separate components, or may be implemented as modules performing the functions thereof in a single processor.

For multilink access described below, each of the interrupt generator 110, the timeslot determination unit 120 and the data transmission determination unit 130 may be provided in plural.

Figure 13:
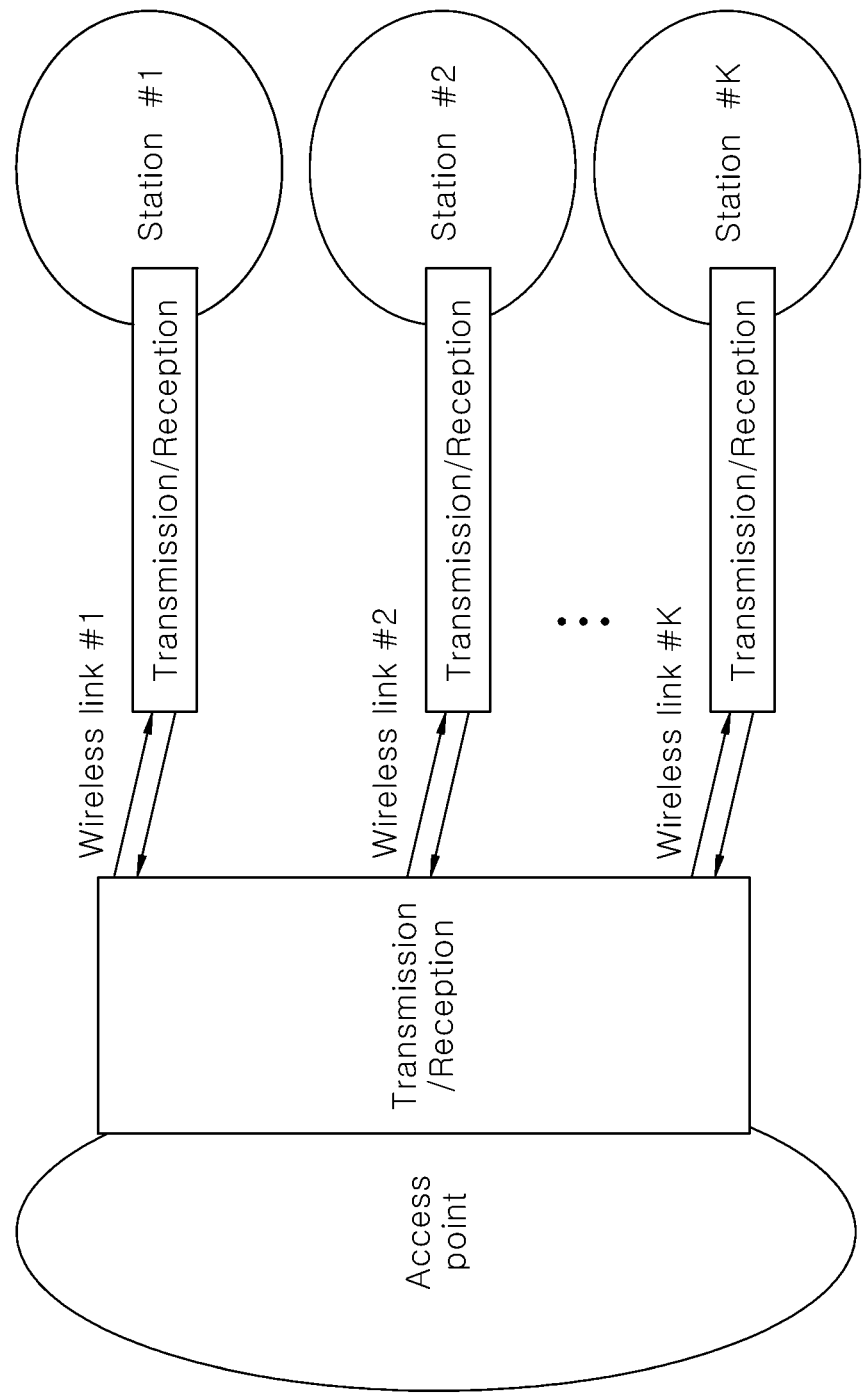
FIGS. 13 and 14 are views illustrating multilink access in a wireless LAN system according to one embodiment of the present invention.
Figure 14:
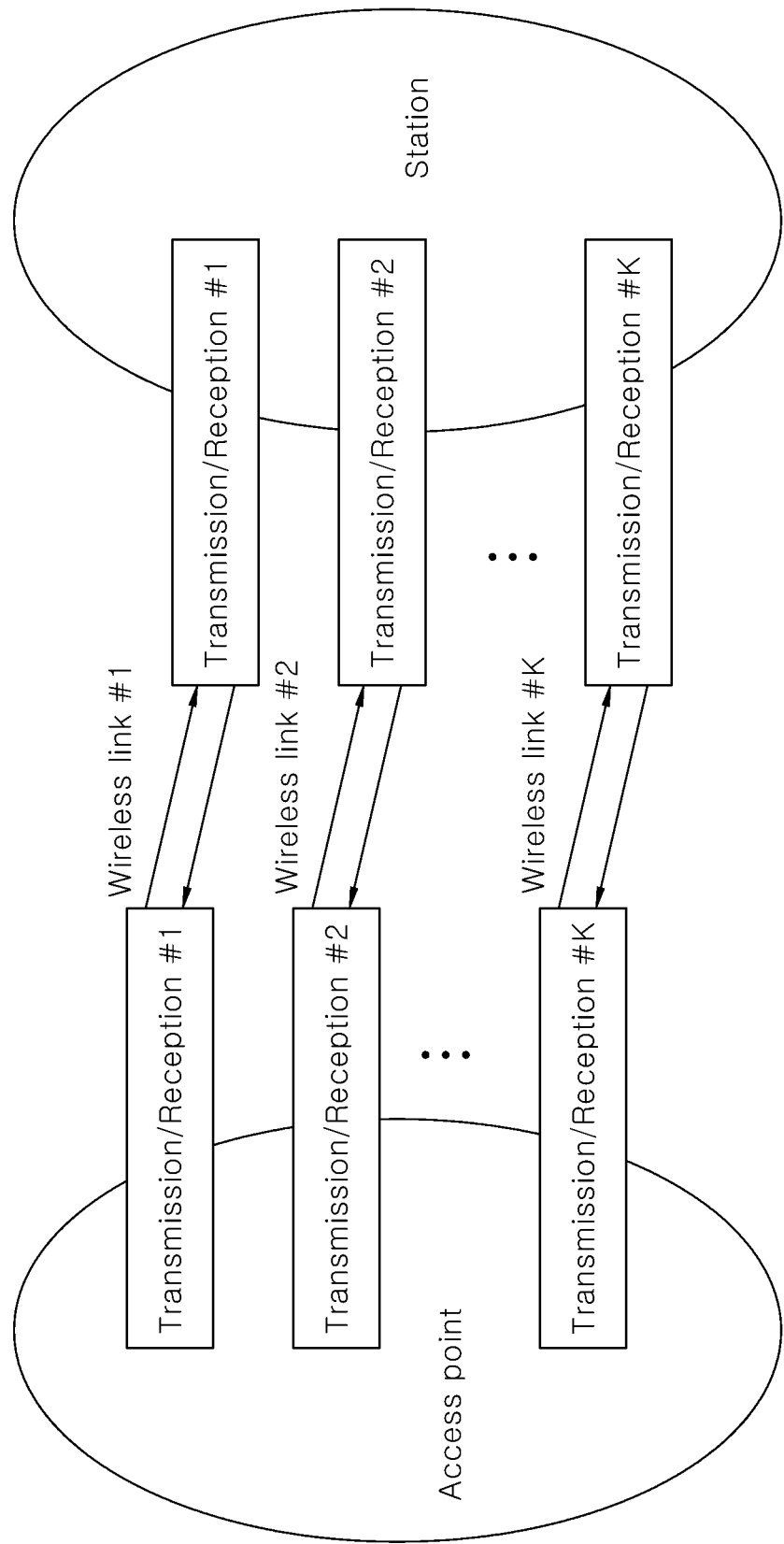

FIGS. 13 and 14 are views illustrating multilink access in a wireless LAN system according to one embodiment of the present invention.

In the embodiment described above, the access point and the station includes a single transmitter/receiver pair. However, the access point and the station may be connected to each other through multiple links. FIG. 13 shows an embodiment in which a wireless link is generated between a single access point and multiple stations with this configuration and FIG. 14 shows an embodiment in which one access point or one station is constituted by multiple transmitter/receiver pairs.

Figure 15:
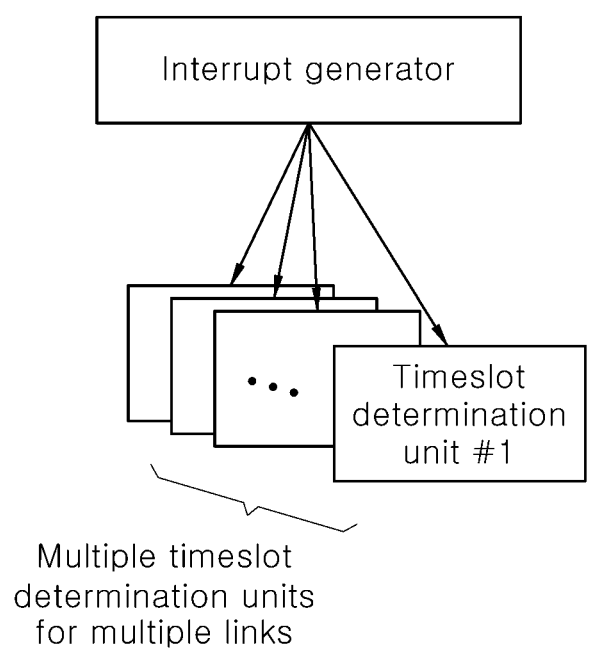
FIG. 15 is a view illustrating the configuration of the apparatus for synchronizing timeslots in the wireless LAN system according to the embodiment of the present invention, which uses a single interrupt generator.
Figure 16:
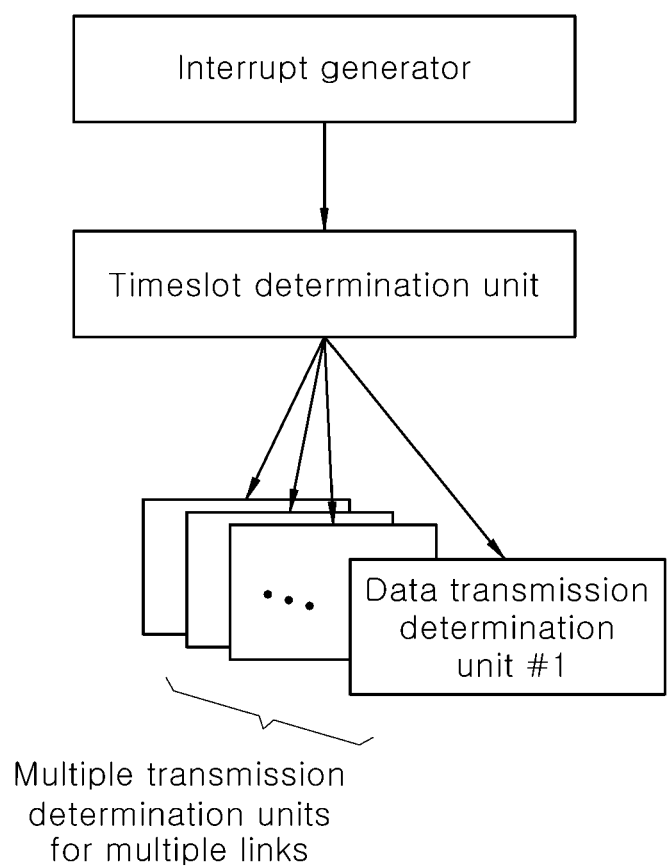
FIG. 16 is a view illustrating the configuration of the apparatus for synchronizing timeslots in the wireless LAN system according to the embodiment of the present invention, which uses a single timeslot determination unit.

FIG. 15 is a view illustrating the configuration of the apparatus for synchronizing timeslots in the wireless LAN system according to the embodiment of the present invention, which uses a single interrupt generator, and FIG. 16 is a view illustrating the configuration of the apparatus for synchronizing timeslots in the wireless LAN system according to the embodiment of the present invention, which uses a single timeslot determination unit.

As described above, since one system can be constituted by multiple wireless LAN transmitter/receiver pairs, a single wireless link may be used by the multiple transmitter/receiver pairs when TSF-based timeslot synchronization between an access point and stations for application of TDMA communication in the wireless LAN according to the present invention is first set with respect to the single wireless link.

For the first transmitter/receiver pair (for example, Wireless link #1 in FIG. 13 or Wireless link #1 in FIG. 14) between the access point and the station, synchronization and TDMA communication are implemented by the TSF-based timeslot synchronization procedure described above.

For other transmitter/receiver pairs (Wireless links #2 to #K), it is possible to use TSF-based timeslot synchronization set in Wireless link #1 instead of starting TDMA communication after new synchronization through the TSF-based timeslot synchronization procedure.

That is, although the process of generating the interrupt signal is shown in FIG. 4 and the process of waiting for transmission of the interrupt signal is shown in FIG. 5, the interrupt signal generated by one interrupt generator as shown in FIG. 15 may be transmitted not only to the timeslot determination unit of Wireless link #1 but to the timeslot determination units of Wireless links #2 to #K so as to be used in timeslot determination for TDMA transmission by the multiple wireless links.

In addition, as shown in FIG. 16, a determination result of one timeslot determination unit may be transmitted to multiple data transmission determination units.

That is, a timeslot determination signal generated by the timeslot determination unit of Wireless link #1 may be transmitted not only to the data transmission determination unit of Wireless link #1 but also to the data transmission determination units of Wireless links #2 to #K to be used in determination as to the need for data transmission for TDMA transmission by the multiple wireless links.

As a result, it is possible to solve the problem of requiring the presence of multiple interrupt generators or multiple timeslot determination units in TSF-based timeslot synchronization between the access point and the stations for application of TDMA communication in the wireless LAN constituted by the multiple wireless LAN transmitter/receiver pairs, and TSF-based timeslot synchronization achieved by one wireless link may also be advantageously used by other wireless links.

However, it should be understood that this result is not limited to the timeslot synchronization apparatus including one interrupt generator or one timeslot determination unit and means that the number of interrupt generators or the number of timeslot determination units can be reduced below the number of wireless links. Accordingly, the timeslot synchronization apparatus according to the present invention may include two or more interrupt generators or two or more timeslot determination units, as needed.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims.

What is claimed is:

1. A method of synchronizing timeslots in a wireless LAN system, comprising:

setting, by a first node, a timeslot synchronization reference based on a time synchronization function (TSF) value, and transmitting information of a reference of synchronization to a second node; and setting, by the second node, a timeslot synchronization reference based on a TSF value corresponding to the reference of synchronization based on the information transmitted from the first node, wherein the timeslot synchronization reference is used to define a periodic slot structure for time-division multiple access (TDMA) communication, wherein timeslot synchronization is carried out by generating an interrupt by each of the first node and the second node.

2. The method of synchronizing timeslots according to claim 1, wherein the timeslot synchronization reference comprises an interrupt start time value and an interrupt generation period.

3. The method of synchronizing timeslots according to claim 2, wherein the timeslot synchronization reference is set based on a timeslot length and a superframe length for time-division multiple access (TDMA) communication.

4. The method of synchronizing timeslots according to claim 1, wherein the first node and/or the second node reads a current TSF value to calculate a timeslot number upon occurrence of the interrupt and determines whether the calculated timeslot number corresponds to a timeslot allocated thereto.

5. The method of synchronizing timeslots according to claim 4, wherein the first node and/or the second node determines whether data transmission is to be performed upon determining that the calculated timeslot number corresponds to the timeslot allocated thereto.

6. The method of synchronizing timeslots according to claim 1, wherein the information about the reference of synchronization comprises information about a timeslot length and a superframe length for TDMA communication.

7. The method of synchronizing timeslots according to claim 6, wherein the information about the reference of synchronization further comprises a TSF value relating to a synchronization start time in the second node.

8. The method of synchronizing timeslots according to claim 1, wherein the first node is an access point and the second node is a station.

9. A method of synchronizing timeslots in a wireless LAN system, comprising:
setting, by a node, a timeslot synchronization reference based on a time synchronization function (TSF) value and based on a timeslot length and a superframe length for time-division multiple access (TDMA) communication; and
performing, by the node, communication through TDMA synchronization according to the timeslot synchronization reference,
wherein the timeslot synchronization reference is used to define a periodic slot structure for TDMA communication,
wherein the timeslot synchronization reference comprises an interrupt start time value and an interrupt generation period.

10. The method of synchronizing timeslots according to claim 9, wherein the step of performing communication through the TDMA synchronization comprises:
reading, by the node, a current TSF value to calculate a timeslot number upon generation of an interrupt; and
determining, by the node, whether the calculated timeslot number corresponds to a timeslot allocated thereto.

11. The method of synchronizing timeslots according to claim 10, wherein the step of performing communication through the TDMA synchronization further comprises determining, by the node, whether data transmission is to be performed upon determining that the calculated timeslot number corresponds to the timeslot allocated thereto.

12. The method of synchronizing timeslots according to claim 10, wherein the node transmits an interrupt generated at one link to another link or transmits a determination result at one link as to whether a calculated timeslot number corresponds to a timeslot allocated thereto to another link, when the node is connected to the other node through multiple links.

13. The method of synchronizing timeslots according to claim 9, further comprising:
receiving, by the node, information about a timeslot length and a superframe length from another node before setting the timeslot synchronization reference.

14. The method of synchronizing timeslots according to claim 13, wherein the information received by the node from the other node further comprises a TSF value regarding a synchronization start time.

15. An apparatus for synchronizing timeslots in a wireless LAN system, comprising:
at least one processor; and a memory having instructions stored thereon, which, when executed by the at least one processor, cause the at least one processor to perform:
an interrupt generator generating an interrupt signal according to an interrupt start time value and an interrupt generation period for timeslot synchronization of time-division multiple access (TDMA) communication, when the interrupt start time value and the interrupt generation period are set;
a timeslot determination unit reading a current TSF value to calculate a timeslot number in response to receiving the interrupt signal, and generating a timeslot allocation determination signal when the calculated timeslot number corresponds to a timeslot allocated thereto; and
a data transmission determination unit determining whether data transmission is to be performed and transmitting data, in response to receiving the timeslot allocation determination signal.

16. The apparatus for synchronizing timeslots according to claim 15, wherein, when an access point is connected to a station or stations through multiple links, the apparatus comprises multiple timeslot determination units allocated to the multiple links, respectively, and the interrupt generator transmits the interrupt signal to the multiple timeslot determination units.

17. The apparatus for synchronizing timeslots according to claim 15, wherein, when an access point is connected to a station or stations through multiple links, the apparatus comprises multiple data transmission determination units allocated to the multiple links, respectively, and the timeslot determination unit transmits the timeslot allocation determination signal to the multiple data transmission determination units.

18. The apparatus for synchronizing timeslots according to claim 15, wherein the interrupt start time value and the interrupt generation period are set based on a time synchronization function (TSF) value.

* * * * *